United States Patent
Bambeck et al.

(10) Patent No.: US 11,383,674 B2
(45) Date of Patent: Jul. 12, 2022

(54) AUTHENTICATION SYSTEM AND CORRESPONDING SECURITY METHOD

(71) Applicant: Liberkee GmbH, Velbert (DE)

(72) Inventors: Daniel Bambeck, Essen (DE); Stefan Schiemann, Cologne (DE); Sven Gennermann, Velbert (DE); Robin Neitzel, Bochum (DE)

(73) Assignee: Liberkee GmbH, Velbert (DE)

( * ) Notice: Subject to any disclaimer, the term of this patent is extended or adjusted under 35 U.S.C. 154(b) by 0 days.

(21) Appl. No.: 17/057,397

(22) PCT Filed: Jun. 3, 2019

(86) PCT No.: PCT/EP2019/064354
§ 371 (c)(1),
(2) Date: Nov. 20, 2020

(87) PCT Pub. No.: WO2019/229269
PCT Pub. Date: Dec. 5, 2019

(65) Prior Publication Data
US 2021/0188211 A1     Jun. 24, 2021

(30) Foreign Application Priority Data
Jun. 1, 2018  (DE) .................... 10 2018 113 162.3

(51) Int. Cl.
| B60R 25/24 | (2013.01) |
| B60R 25/10 | (2013.01) |
| B60R 25/102 | (2013.01) |
| B60R 25/30 | (2013.01) |
| G07C 9/00 | (2020.01) |
| G07C 9/27 | (2020.01) |

(52) U.S. Cl.
CPC ............ *B60R 25/24* (2013.01); *B60R 25/102* (2013.01); *B60R 25/1003* (2013.01); *B60R 25/30* (2013.01); *G07C 9/00309* (2013.01); *G07C 9/27* (2020.01); *B60R 2025/1013* (2013.01); *B60R 2325/20* (2013.01); *G07C 2009/00539* (2013.01); *G07C 2009/00769* (2013.01)

(58) Field of Classification Search
None
See application file for complete search history.

(56) References Cited

U.S. PATENT DOCUMENTS 5,774,044 A * 6/1998 Hayashi .............. B60R 25/1018
                                                                 180/287
6,611,232 B1   8/2003 Wunderlich et al.

FOREIGN PATENT DOCUMENTS

| CN | 205706463 U | 11/2016 |
| DE | 10149344 A1 | 4/2003 |
| DE | 102004005513 A1 | 8/2005 |
| DE | 102005059061 A1 | 6/2007 |
| DE | 102006001410 A1 | 7/2007 |

(Continued)

*Primary Examiner* — Carlos Garcia
(74) *Attorney, Agent, or Firm* — Rudy J. Ng; Bret E. Field; Bozicevic, Field & Francis LLP (57) ABSTRACT

The invention relates to an authentication system (10) for a vehicle (100), in particular a motor vehicle (100), for storing an ID-transmitter (80) in the vehicle (100) with an outer housing (11) in which the ID-transmitter (80) can be stored. In this case it is provided that an electronic security unit is provided to monitor at least the secure storage of the ID-transmitter (80) within the outer housing (11).

21 Claims, 6 Drawing Sheets

(56) References Cited

FOREIGN PATENT DOCUMENTS

| DE | 102014119287 A1 | 7/2016 |
|----|-----------------|--------|
| GB | 1154671 A | 6/1969 |
| GB | 2369406 A | 5/2002 |

* cited by examiner

AUTHENTICATION SYSTEM AND CORRESPONDING SECURITY METHOD

The present invention relates to an authentication system according to the type defined in more detail in the preamble of the independent device claim. Furthermore, the invention relates to a monitoring method according to the preamble of the independent method claim.

It is known that in particular in big cities the so-called car-sharing is becoming more and more popular. In car-sharing, vehicles are made available by a car-sharing provider, which a user can borrow in order to, for example, cover a certain distance or carry out a certain task, such as shopping. The user then parks the vehicle again so that it is available for the next user. Unfortunately, it is also common that the ID-transmitter (also called a key) to open the locking system and to start the engine is for example arranged in the glove compartment of the car-sharing vehicle. However, the ID-transmitter can be accessed by a burglar, for example, if he or she gains unauthorized access to the vehicle, e.g. by breaking a window, so that it is easy for the burglar to overcome the immobilizer with the ID-transmitter located in the glove compartment.

Another problem is that individual solutions for each user's access to the immobilizer, e.g. through a code provided by the car-sharing provider, would require major retrofitting or expensive modifications to the vehicle. Major retrofitting could include, for example, the installation of a special locking system of the vehicle for car-sharing operations. Usually, however, car-sharing vehicles are often series-production vehicles that should be converted into car-sharing vehicles with the least possible effort, so that costs are kept to a minimum.

A disadvantage of the known solutions is that the ID-transmitter is not securely accommodated in the vehicle interior. It is therefore an object of the present invention to at least partially eliminate the disadvantages described above. In particular, it is an object of the present invention not to accommodate the ID-transmitter freely and accessibly in the vehicle.

The preceding object is solved by an authentication system with the features of the independent device claim and by a monitoring method with the features of the independent method claim. Further features and details of the invention result from the respective dependent claims, the description and the figures. Features and details described in connection with the inventive authentication system are of course also valid in connection with the inventive monitoring method, and vice versa, so that with regard to disclosure, reference is or can always be made to the individual aspects of the invention.

The object is solved in particular by an authentication system for a vehicle, in particular a motor vehicle, for storing an ID-transmitter in the vehicle with an outer housing in which the ID-transmitter can be stored. In particular, it is provided that an electronic security unit is provided to monitor at least the secure storage of the ID-transmitter within the outer housing. As soon as an unauthorized user tries to access the ID-transmitter from the outer housing, the electronic security unit recognizes the unauthorized access and triggers an alarm signal.

The core of the present invention is thus, that the (external) ID-transmitter is secured and inaccessibly accommodated by the electronic security unit in the outer housing of the authentication system. Thus, the ID-transmitter is not (only) mechanically but also electrically securely accommodated in the authentication system. As soon as a theft attempt and/or manipulation attempt of this system is made, it is detected by the electronic security unit and a corresponding alarm signal can be output. On the basis of this alarm signal, at least an acoustic warning tone, a final blocking of the vehicle's immobilizer, or even the destruction of the ID-transmitter can then occur. Further methods for an alarm signal are listed in the following text. In particular, the electric security of the ID-transmitter by the electronic security unit is extremely reliable and can be realized at low cost. In contrast, the construction and the choice of materials (hardened metal alloys) for a mechanical security of the ID-transmitter is very complex, comparable to the construction of a small safe.

In the context of the present invention, the term authentication system means that this system enables a vehicle to be opened and also started properly if the corresponding authentication is available. However, this is not done by directly actuating the ID-transmitter for the corresponding vehicle, but indirectly via the authentication system. Thus, the authentication system is interposed between the user of the vehicle and the vehicle-side access and authorization system with the corresponding ID-transmitter. It is useful if the authentication system can be opened by the user (car-sharing driver) with a mobile communication device, such as a cell phone, a tablet or a laptop (wireless or via radio). Here, the mobile communication device can communicate directly with the authentication system via a (first) interface and/or indirectly with the authentication system via another interface and an external network or external server.

The corresponding user of the authentication system can address the authentication system via his mobile communication device using a corresponding release code and, if the release code and any further authorization queries are positive, trigger an actuation of the ID-transmitter within the vehicle. For this purpose, the corresponding actuation signal can be generated on the mobile communication device and/or a network or server, which has been expediently generated outside the vehicle, e.g. on the basis of the release code and any further authorizations, such as personal details, credit card, location, time period and/or similar. Only one (preferably wireless) communication can occur between the mobile communication device and the authentication system. It is also conceivable that in addition or even only one communication between the external network or external server and the authentication system occurs. If only the external network or the external server communicates with the authentication system, the communication can occur via the (first) interface. It is to be assumed that the mobile communication device for authentication exchanges data with the external network or the external server in advance so that the release code and any further authorization queries are positive.

A further advantage within the scope of the invention is achievable if an electronic unit is available for the authentication system, wherein in particular the electronic unit comprises at least one interface, wherein preferably the ID-transmitter can be actuated from outside the authentication system. Through this interface, the data communication for authentication of the user can occur between the mobile communication device and/or the external network or server. This interface can preferably be a Bluetooth or NFC interface, in particular if the communication is only between the mobile communication device and the authentication system. A mobile radio interface, such as LTE, UMTS or similar, may also be provided. It is advisable to use encrypted data transmission (with this interface) to make manipulation more difficult.

Furthermore, it is conceivable that the ID-transmitter can be actuated, preferably mechanically, by the authentication system. In this case, an actuation signal for the ID-transmitter can preferably reach the authentication system from outside, in particular via an interface. Thus, the ID-transmitter is not actuated directly by the user, which is not possible either, since it is located inaccessibly within the authentication system. Rather, a secured (purely) mechanical actuation of the ID-transmitter after successful authentication (upon presentation of a release code) is performed indirectly by the authentication system itself. This makes the authentication system ideal as a retrofit system for existing series production vehicles (to car-sharing vehicles), since no intervention in the existing vehicle electronics is required.

It is further conceivable that an electrical drive, in particular for mechanical actuation of the ID-transmitter, is provided inside the outer housing, wherein preferably the drive can be controlled by the electronic unit, in particular on the basis of an existing actuation signal which has reached the authentication system from outside. This means that the generally available external ID-transmitter, which is usually used by the user in series production vehicles (not yet converted car-sharing vehicles), does not have to be changed. Thus, the system according to the invention offers a large variety of possible applications for car-sharing vehicles, since it can be used independently of the respective vehicle manufacturer.

For example, an inlay may be provided for mechanical fixation of the ID-transmitter, and the inlay may be arranged inside the outer housing. This inlay serves to position the external ID-transmitter locally within the outer housing. Ideally, a receiving region within the inlay is provided for this purpose, which is preferably designed geometrically complementary to the outer shape of the ID-transmitter in order to be able to securely fix the ID-transmitter mechanically within the inlay. It is also conceivable that the ID-transmitter can be mechanically actuated by an actuating mechanism which is preferably driven by the drive. This mechanical actuating mechanism can be designed with its drive wheel and at least two actuating tappets for the external ID-transmitter, wherein preferably the actuating tappets are arranged on a drive shaft in a rotationally fixed manner (they always rotate with the shaft), in particular via a multi-gear connection. The drive wheel of the actuating mechanism is expediently firmly connected to the drive shaft (and thus also to the actuating tappets) and can be driven by the electric drive via a worm gear. The drive itself can be controlled by the electronic unit. It may also be provided that a battery adapter can be used for voltage supply of the ID-transmitter, wherein in particular the battery adapter can be electrically connected to the electronic unit. The battery adapter can also be used to destroy the electronics of the ID-transmitter in the event of an overvoltage that can be deliberately generated by the electronic unit. This can happen in particular if an alarm signal is present, thus eliminating any possibility for an unauthorized user to continue using the ID-transmitter in case of an attempted break-in.

Optionally, it may be possible that at least one closing element is provided, wherein in particular an opening in the outer housing can be closed at least partially or completely. This ensures that the ID-transmitter can only be removed from the outer housing of the authentication system through the opening closed by the closing element. Otherwise, only destruction of the housing can lead to unauthorized removal of the ID-transmitter. It is advantageous that the closing element can also be used for mechanical fixation of the electronic unit within the outer housing. Thus, two functions can be achieved simultaneously with the corresponding closing element.

Furthermore, it is conceivable within the scope of the invention that at least one closing element can be fastened to the outer housing in a mounting position by at least one fastening element. Thus, the closing element can be securely fixed in the opening of the outer housing. At least one monitoring sensor (of the electronic security unit) can monitor at least the closing element in its closed position or the fastening element in the mounting position. Thus, an unauthorized removal of the fastening element for opening the closing element or the opening can be directly detected by measurement by a monitoring sensor.

The mounting position is the position in which the authentication system is fastened (by at least one fixing element) and closed (by at least one closing element) ready for use in the vehicle. In this position, the existing monitoring sensors of the security unit are able to immediately detect a theft attempt and/or manipulation attempt.

In addition, it is advantageous if the inlay for mechanical fixation of the ID-transmitter is also provided with a further closing element. In this case, the existing closing elements can jointly close the entire opening of the outer housing in a mounting position. Both the electronic unit and the inlay can be fastened to or inside the outer housing by means of holding and/or engaging means. These holding and/or engaging means can interact with the monitoring sensors in the mounting position in such a way that any change to release the holding and/or engaging means results in a status signal from the monitoring sensors. Only in a so-called workshop mode of the authentication system the monitoring of the holding and/or engaging means can be deactivated in order to carry out maintenance and repair work. It is advisable to switch between a monitoring mode, in which active monitoring of the authentication system, in particular of the outer housing, occurs, and a workshop mode only from the outside by means of a corresponding unlock code (from an external device, network and/or server). Without this unlock code an unauthorized and unnoticed removal of the ID-transmitter from the authentication system is not possible.

A further advantage within the scope of the invention is achievable if the authentication system comprises its own voltage supply, preferably the voltage supply comprises at least one accumulator, a battery or a capacitor. Thus, the authentication system can be operated separately from the vehicle electronic system and/or the vehicle voltage supply. Thus, it is also possible that the own voltage supply of the authentication system can be operated independently of a vehicle battery. It may be useful to design the voltage supply of the authentication system to be electrically rechargeable. Thus, the voltage supply can recharge itself and remain functional as soon as energy is supplied from outside. This means that it is not sufficient to disconnect the vehicle battery in the event of theft, since the authentication system is designed to be quasi self-sufficient by means of the rechargeable voltage supply.

According to a further possibility, it may be provided that the electronic security unit is part of the electronic unit of the authentication system, wherein in particular the electronic security unit is arranged on a printed circuit board of the electronic unit. In this way, a cost-effective and space-saving structure of the authentication system can be generated. Manipulations can also be made more difficult, since it is not directly recognizable which electronic component belongs to the security unit.

Within the scope of the invention it is further conceivable that an interference signal transmitter, preferably in the form of an antenna, is present, with which a transmitting and/or receiving signal of the ID-transmitter can be interfered with, wherein in particular the interference signal transmitter can be controlled by the electronic unit. By means of this interference signal transmitter it is possible to completely interfere with a signal of the external ID-transmitter which can be arranged above it. This means that the ID-transmitter is then not able to effectively transmit an opening signal for the central locking system or a release signal for the engine management system or the immobilizer of the vehicle. The ID-transmitter is thus rendered inoperable by the transmitted interference signal.

It may be expediently provided that the electronic security unit comprises at least one monitoring sensor, and/or wherein preferably the monitoring sensor comprises at least one switch, button, magnetic switch, optical sensor, acceleration sensor, touch sensor, pressure sensor, force sensor, Hall sensor, temperature sensor and/or acoustic sensor. The respective monitoring sensors provide a variety of monitoring and also redundancies in monitoring to increase security. It is also conceivable that at least one monitoring sensor can be positioned independently of the position of the security unit. This allows a particularly flexible application.

It is further conceivable that at least one monitoring sensor generates at least one status signal at a theft attempt and/or manipulation attempt of the authentication system and transmits it to the electronic security unit, which triggers an alarm signal at least in the monitoring mode. In order to enable e.g. a repair in the invention, the workshop mode (by remote control) must be switched on beforehand.

Based on the existing monitoring sensors, the electronic security unit is able to register various theft and manipulation attempts by measurement. For example, a light sensor used as a monitoring sensor can optically detect the drilling of the housing as soon as light enters the interior of the outer housing through the drilled hole. It is also conceivable to equip at least a partial region of the outer housing with a vacuum or overpressure volume, which drops to a normal ambient pressure as soon as the housing is disturbed at the respective location by a drilling attempt or other attempt. For this purpose, a pressure sensor can monitor the corresponding over- or under pressure. In addition, an acceleration sensor inside the outer housing, for example, can detect a change of position in the rest state (monitoring mode). All these events can cause the monitoring sensors to generate a status signal and transmit it to the electronic security unit, which then triggers an alarm signal at least in the monitoring mode.

Furthermore, it is optionally provided that a first interface is provided which enables wireless data transmission to the authentication system, wherein preferably the first interface enables bidirectional data transmission, and/or wherein preferably via the first interface an external control of the authentication system occurs, in particular in order to actuate the ID-transmitter, and/or an alarm signal can be conducted to the outside. This interface can preferably be a Bluetooth or NFC interface, which enables (in particular encrypted) data exchange directly with the user's mobile communication device.

It is also advantageous if a second interface is provided, which enables data transmission between a vehicle electronic system and the authentication system, preferably to exchange an alarm signal. This second interface also allows additional security, e.g. of the immobilizer from the vehicle management system or an electric steering wheel locking device.

It may also be possible that a fixing element, in particular in the form of a mounting plate or a housing tie (similar to a cable tie), is provided to fasten the authentication system, in particular the outer housing, in the vehicle. It is also conceivable that at least one holding means is provided for the mechanical connection between the fixing element and the outer housing in a mounting position, and/or wherein preferably the mechanical connection between the fixing element and the outer housing in the mounting position can be monitored by at least one monitoring sensor. This means that the mounting of the authentication system in the vehicle can also be monitored by at least one monitoring sensor of the electronic security unit. As soon as the mounting plate or a fixing element is manipulated, it can be detected by measurement and can lead to a status signal and finally to an alarm signal.

In particular, the authentication system can thus be a remote-controlled key safe in which the ID-transmitter can be securely stored. Preferably, the outer housing can comprise a space volume that is less than or equal to 200 mm×150 mm×150 mm. This allows the authentication system to be placed in different regions of the vehicle.

It is also conceivable that at least two monitoring sensors are present, wherein preferably in the mounting position a first monitoring sensor monitors the closing element and a second monitoring sensor monitors the mounting plate for the respective position. Other monitoring sensors are also conceivable, such as a light sensor or an acceleration sensor. Due to the different sensors, different attempts to break in can be detected.

It may preferably be provided within the scope of the invention that the outer housing is a plastic injection molded part, wherein preferably reinforcing elements, in particular of metal, carbon and/or glass fiber, are present on or in the outer housing. Such an outer housing is geometrically complex and can nevertheless be produced at low cost. It is also possible to provide this outer housing pressure-tight, light-tight and/or dust-tight. Thus, the outer housing of the authentication system can be completely closed except for an opening through which the electronic unit with the electronic security unit and also the external ID-transmitter can be inserted. At least one closing element can be provided to close this opening. Ideally, it may be provided that the outer housing is completely closed in itself except for the one opening.

It is furthermore advantageous if, within the scope of the invention, the monitoring sensors are electrically connected to the security unit via at least one connecting cable, wherein in particular the respective connecting cable can also be monitored for manipulations, e.g. by resistance measurements. Hereby, the sensors can be placed and used everywhere in the outer housing.

Also subject of the invention is a monitoring method for monitoring an authentication system for a motor vehicle for storing an ID-transmitter in the vehicle, in particular according to one of the previous claims, with an outer housing in which the ID-transmitter can be stored. It is provided here that a theft attempt and/or manipulation attempt of the authentication system triggers at least one alarm signal. Thus, the inventive monitoring method brings the same advantages as they have been disclosed in detail with respect to the inventive authentication system.

It is also conceivable that at least one mechanical theft attempt and/or at least one electronic or mechanical manipulation attempt (by measurement by the monitoring sensors) is detected and triggers an alarm signal. This alarm can also render the ID-transmitter non-functional.

Preferably, the invention may provide that the monitoring method comprises at least two operating modes:
  a) the monitoring mode, in which an active monitoring of the authentication system, in particular of the outer housing, occurs,
  b) the workshop mode, in which the monitoring is deactivated in order to perform maintenance and repair work on the authentication system.

Other operating modes are also conceivable, such as the alarm mode, in which an alarm signal has been triggered.

Furthermore, it is optionally possible within the scope of the invention that at least in the monitoring mode the authentication system can actuate the ID-transmitter, in particular mechanically, wherein preferably an actuation signal for the ID-transmitter reaches the authentication system from outside, preferably via an interface. Thus, the method is suitable for converting series production vehicles into car-sharing vehicles without any intervention in the existing vehicle electronic system.

For example it may be intended that with a triggered alarm signal a destruction of the ID-transmitter, in particular of the electronics of the ID-transmitter, is performed and/or with a triggered alarm signal a warning signal is sent to the management system of the vehicle, wherein preferably an electric immobilizer is blocked, and/or with a triggered alarm signal an acoustic siren is controlled, and/or with a triggered alarm signal a warning signal is sent to an external assistance server, and/or with a triggered alarm signal the vehicle's lighting system is switched on and/or an emergency signal is sent to the police or a security service.

Further advantages, features and details of the invention result from the following description in which, with reference to the figures, embodiments of the invention are described in detail. The features mentioned in the claims and in the description may be individually or in any combination essential to the invention. The figures show:

In the following figures, identical reference signs are used for the same technical features even from different embodiments.

Figure 1:
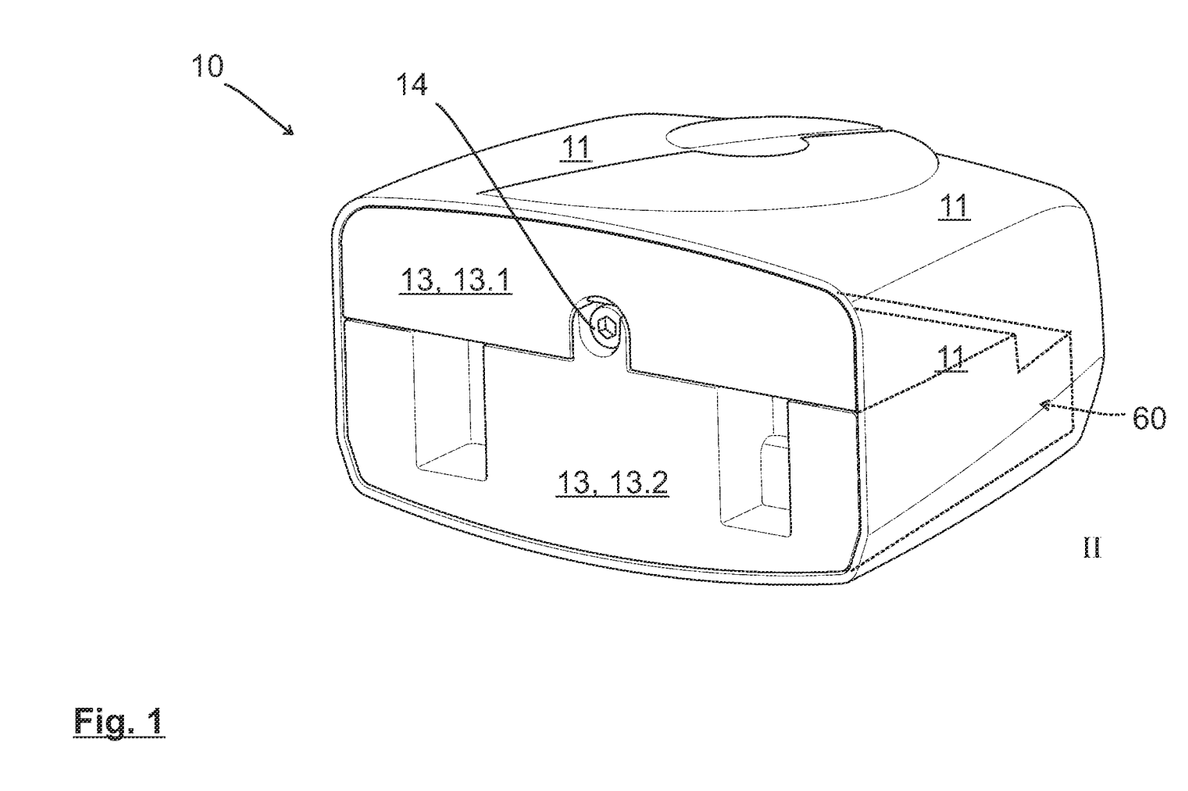
FIG. 1 a three-dimensional view on an authentication system according to the invention and the corresponding outer housing in a closed state, FIG. 2 a three-dimensional view of an inlay for mechanical fixation of the ID-transmitter with a battery adapter, FIG. 3 a front and back side of an external ID-transmitter, FIG. 4 a three-dimensional view of an authentication system from FIG. 1 with an electronic unit including an actuating mechanism for the external ID-transmitter and an interference signal transmitter without inlay for mechanical fixation of the ID-transmitter, FIG. 5 a bottom view of the authentication system from FIG. 1 with mounted fixing element, in the form of a mounting plate, FIG. 6 a back view of the authentication system from FIG. 1 with mounted fixing element on the bottom side, FIG. 7 a schematic sectional view of an actuating mechanism with a corresponding drive and an ID-transmitter within the inlay and FIG. 8 an inventive vehicle with the inventive authentication system and a mobile communication device for control.

FIG. 1 shows a three-dimensional view of an inventive authentication system 10 for a vehicle 100, in particular for a motor vehicle 100. The authentication system 10 advantageously comprises a one-piece outer housing 11, which is provided with only one opening 12. This opening 12 is used to arrange the electronic unit 20 as well as an inlay 60 for mechanical fixation of the ID-transmitter 80 inside the outer housing 11. It is advisable to close the opening 12 of the outer housing 11 by at least one closing element 13, in this case two closing elements, namely a first 13.1 and a second closing element 13.2. The two closing elements 13 are connected by a fastening element 14, in particular in the form of a screw. To accommodate the ID-transmitter 80 securely and inaccessibly in the outer housing 11 of the authentication system 10, an electronic security unit is provided which monitors the secure storage within the outer housing 11.

In the following figures, individual components of the inventive authentication system are presented in more detail.

Figure 4:
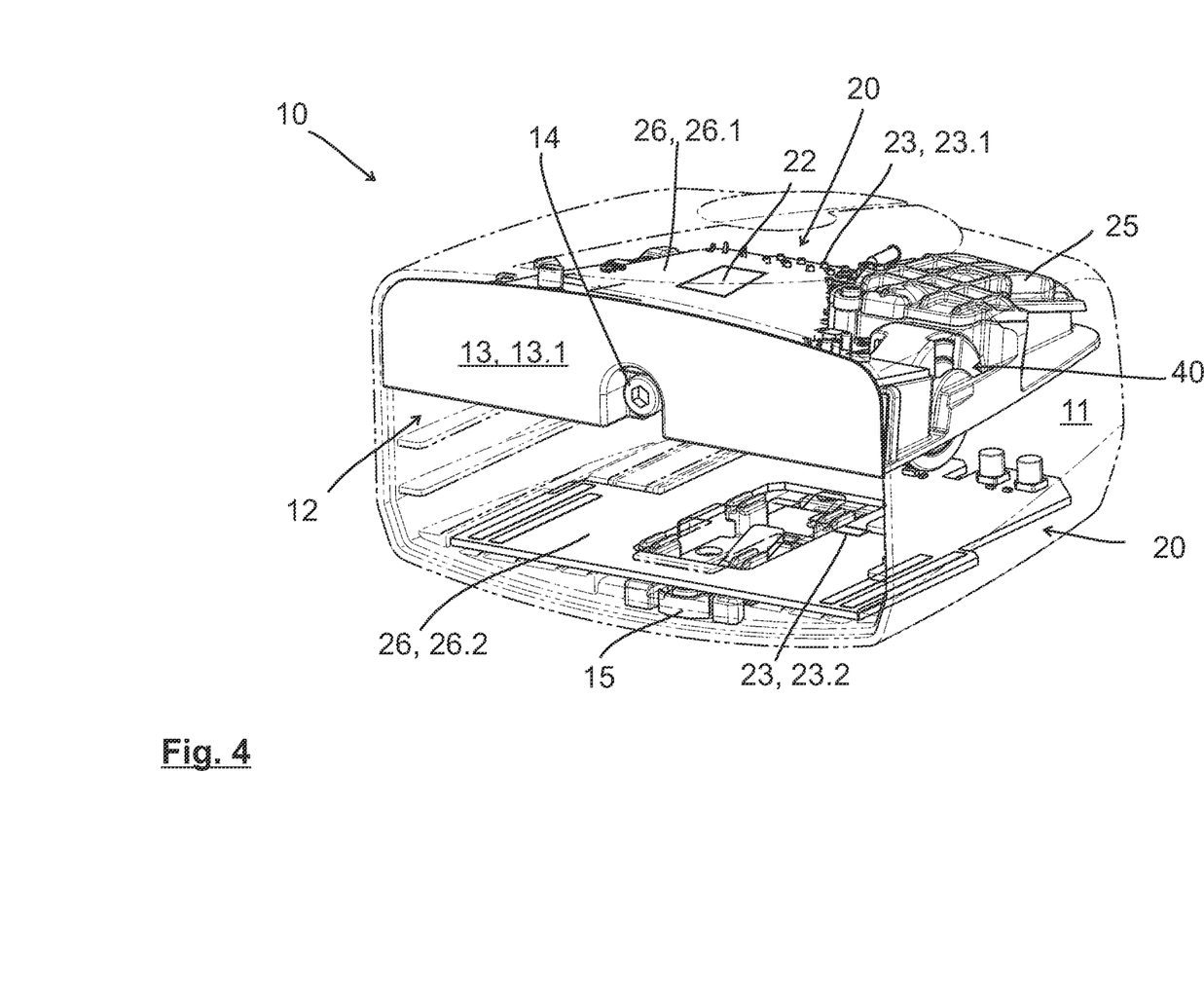

For example, FIG. 4 shows an electronic unit 20 inside the outer housing 11 for the authentication system 10. It is additionally equipped with an actuating mechanism 40 for mechanical actuation of the ID-transmitter 80 (see FIG. 7). This electronic security unit comprises at least two printed circuit boards 26, namely an upper 26.1 and a lower printed circuit board 26.2, which are connected to each other via electric connections. On the upper printed circuit board 26.1, electronic components can be seen which may form part of the electronic security unit 22. In addition, these electronic components may also form various interfaces 21. In addition, this electronic unit 20 also comprises a drive 25 which serves to drive the actuating mechanism 40 for the ID-transmitter 80 (see FIG. 7). Various monitoring sensors 23 can also be arranged on these printed circuit boards 26 of the electronic unit 20, which, for example, monitor the security fit of a fastening element, in particular the screw for the closing element 13, in the closed position. This can be a mechanical button 80.1, for example. In addition, the monitoring sensors 23 can also comprise light sensors, acoustic sensors or motion and acceleration sensors, through which theft and manipulation attempts can be directly detected by measurement and transmit corresponding status signals to the electronic security unit. If the electronic security unit is switched on in the monitoring mode, an alarm signal can be generated. The lower printed circuit board 26.2 of the electronic unit 20 can be designed as an interference signal transmitter with a corresponding coil printed on it. By means of this interference signal transmitter it is possible to completely interfere with a signal of the external ID-transmitter 80 arranged above it. This means that the ID-transmitter 80 is then not able to effectively transmit an opening signal for the central locking system or a release signal for the engine management system or the immobilizer of the vehicle 100. Below the lower printed circuit board, a fixing element 15 in the form of a mounting plate 15 is indicated, which can be positioned or fixed by holding means, in particular in the form of engaging means on the outer housing 11 of the authentication system 10. By means of a corresponding monitoring sensor 23, in particular in the form of a Hall sensor, or a pressure sensor, the corresponding holding means for connecting the fixing element 15 to the outer housing 11 can be monitored by measurement for their proper fit or position.

Figure 2:
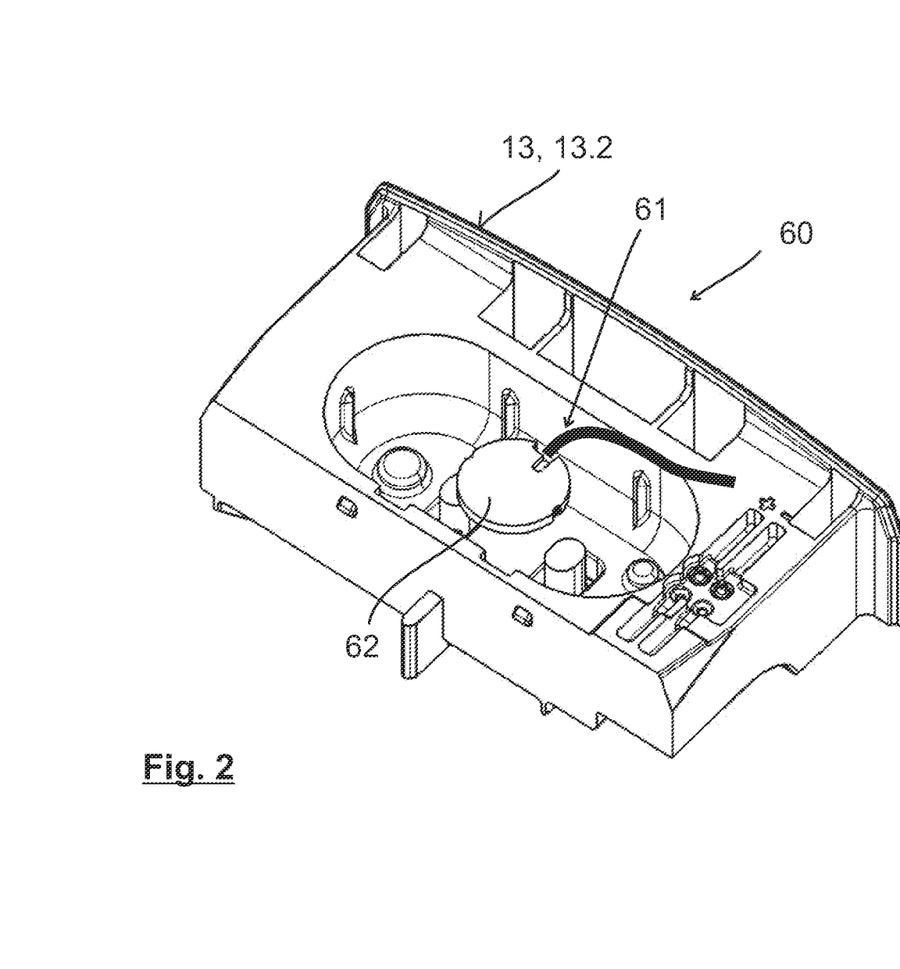

FIG. 2 shows for example an inlay 60 for mechanical fixation of the external ID-transmitter 80. This inlay 60 serves to position the external ID-transmitter 80 locally within the outer housing 11. Ideally, a receiving region 61 inside the inlay 60 is provided for this purpose, which is geometrically complementary to the outer shape of the ID-transmitter 80 in order to be able to reliably fix the ID-transmitter 80 mechanically inside the inlay 60. To ensure that the ID-transmitter 80 is always electrically operable, a battery adapter 62 can be provided which supplies the ID-transmitter 80 with voltage from the authentication system 10. The corresponding battery adapter 62 is shown in FIG. 2 with the connecting wires and the contact lugs for contacting the electronic unit 20. With this battery adapter 62, it is also possible to cause destruction of the ID-transmitter 80, in particular of the electronics of the ID-transmitter 80 by an overvoltage.

Figure 3:
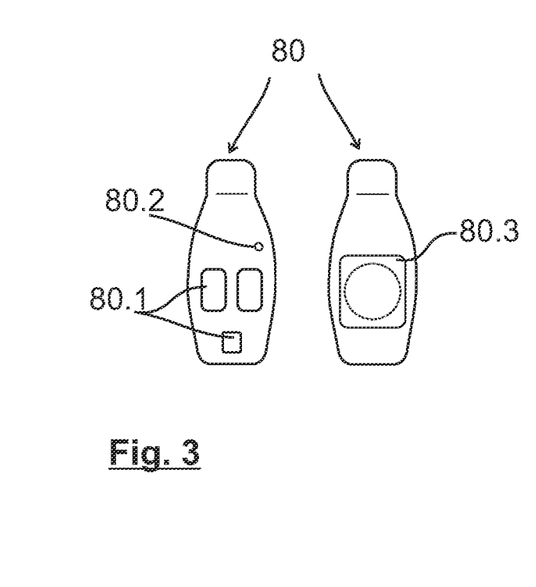

FIG. 3 shows an exemplary ID-transmitter 80 on the left in front view and on the right in back view. The front view shows the buttons 80.1 and a display 80. These buttons 80.1 can be mechanically operated within the authentication system 10 by the actuation mechanism 40 (see FIG. 7). Only the corresponding actuation signal must be present, whereupon the electronic unit 20 controls the actuation mechanism 40 via a drive 25 and thus acquires a purely mechanical actuation of the ID-transmitter 80. As can be seen from the back side of the ID-transmitter 80, it comprises a battery compartment in which the battery adapter 62 can be arranged for a permanent voltage supply.

FIG. 1 also shows the closing state II of the authentication system 10, wherein the inlay 60, indicated by a dashed line, is inserted through the opening 12 of the outer housing 70 for mechanical fixation of the ID-transmitter 80 (see FIG. 4). The inlay 60 is secured in its corresponding position (in the closing state II) inside the outer housing 11. It is advisable to provide this inlay 60 with fastening means 14 which engage with the outer housing 11 from inside, preferably independently. These fastening elements 14 can be monitored accordingly by the monitoring sensors 23 provided. A change in the position of the fastening elements then leads to a status signal at the monitoring sensors 23, which transmit this to the electronic security unit 22, whereupon an alarm signal is generated if necessary.

FIG. 4 shows the authentication system 10 from FIG. 1, but without the inlay 60 for the mechanical fixation of the ID-transmitter 80. Hereby, the electronic unit 20 is pre-mounted with the actuating mechanism 40 and the interference signal transmitter in the dashed outer housing 11 of the authentication system 10. In the gap between the upper printed circuit board 26.1 and the lower printed circuit board 26.2 of the electronic unit 20, the inlay 60 can be arranged for the mechanical fixation of the ID-transmitter 80 so that the external ID-transmitter 80 can also be arranged directly above the lower printed circuit board 26.2. In addition, the actuating mechanism 40 with its tappets 43, 44 can act mechanically on the buttons 80.1 of the ID-transmitter 80 from above. FIG. 4 also shows exemplary positions for the monitoring sensors 23. The electronic unit 20 can also be fixed by means of fastening elements, in particular holding and/or engaging elements inside the outer housing 11 of the authentication system 10. At the same time, the electronic unit 20 also comprises a closing element 13, just like the inlay 60 for mechanical fixation of the ID-transmitter 80. With the two closing elements 13, the opening 12 in the outer housing 70 can thus be completely closed.

Figure 5:
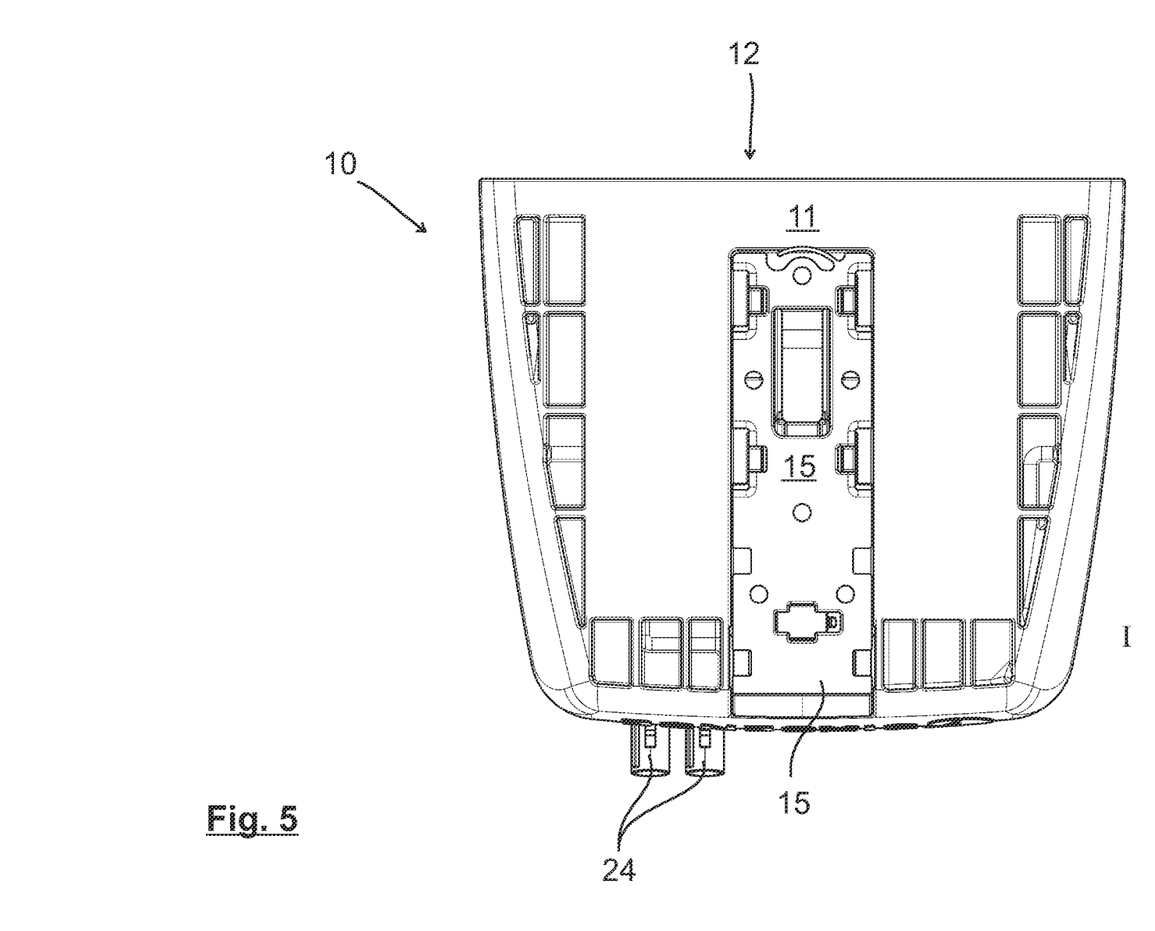

FIG. 5 shows a bottom view of the authentication system 10 from FIG. 1. Thereby, the fixing element 15 is already mounted in the form of a mounting plate. Usually, the mounting plate is first fastened to the vehicle 100, e.g. by screwing or riveting, and then the authentication system 10 is mounted by pushing on the outer housing 11. The fixing element 15, in particular the mounting plate, is equipped with holding means that generate a mechanical connection between the fixing element 15 and the outer housing 11. This mechanical connection can also be reliably monitored by measurement in the mounting position I by the monitoring sensors 23 provided. Thus, even the removal of the outer housing 11 from the fixing element 15 results in an alarm of the authentication system 10.

Figure 6:
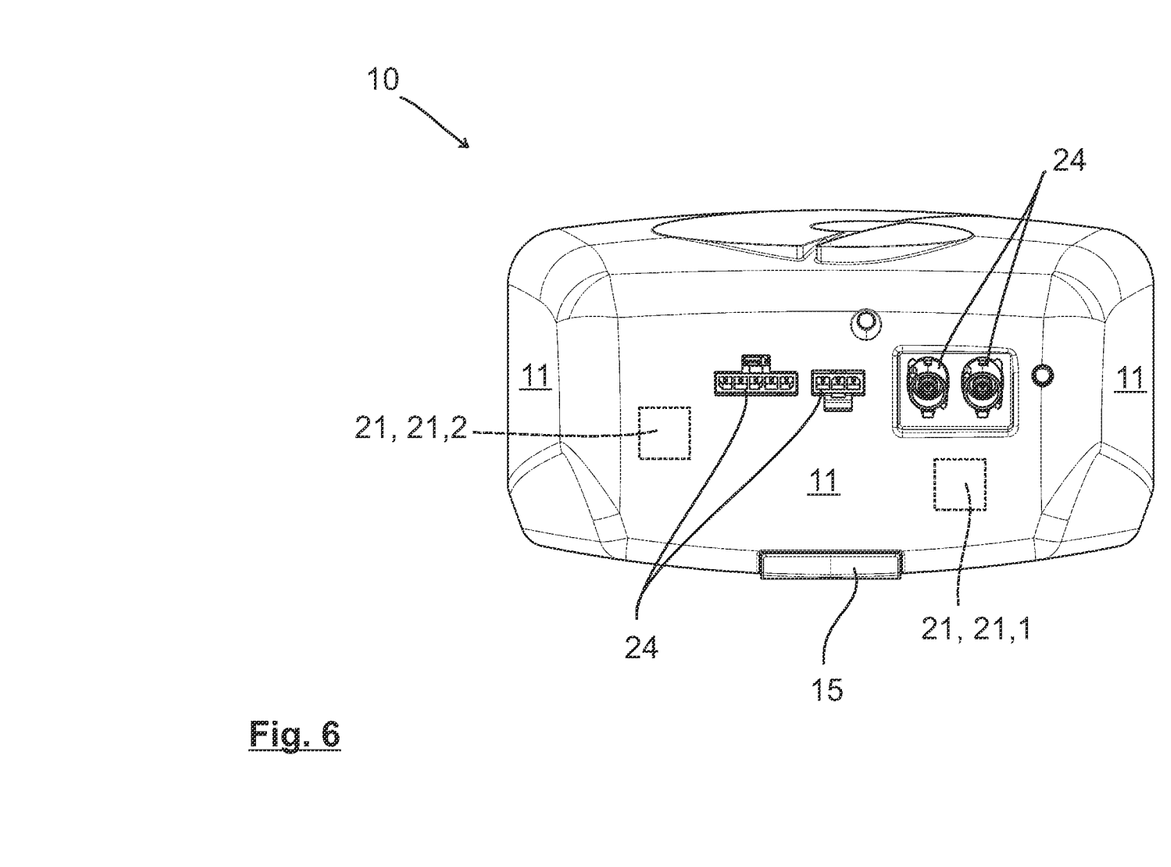

FIG. 6 shows the back side of the authentication system 10 with various plugs 24 for connection to a vehicle-side electronic system. In the region of the bottom, the pre-mounted fixing element 15, which is surrounded by the outer housing 70 from at least three sides in a form-locking manner, is shown. Ideally, the plug connections on the back side should also have engaging means to prevent these plug connections in the vehicle 100 from being shaken loose by the corresponding vibration in the vehicle 100. As can be seen from FIG. 6, the entire outer housing 11 is closed in itself except for the opening 8. This outer housing 11 is also formed by a one-piece injection molded plastic part. In order to make mechanical breaking-open more difficult, additional reinforcing elements can be provided on or inside the outer housing 11.

Figures 7, 8:
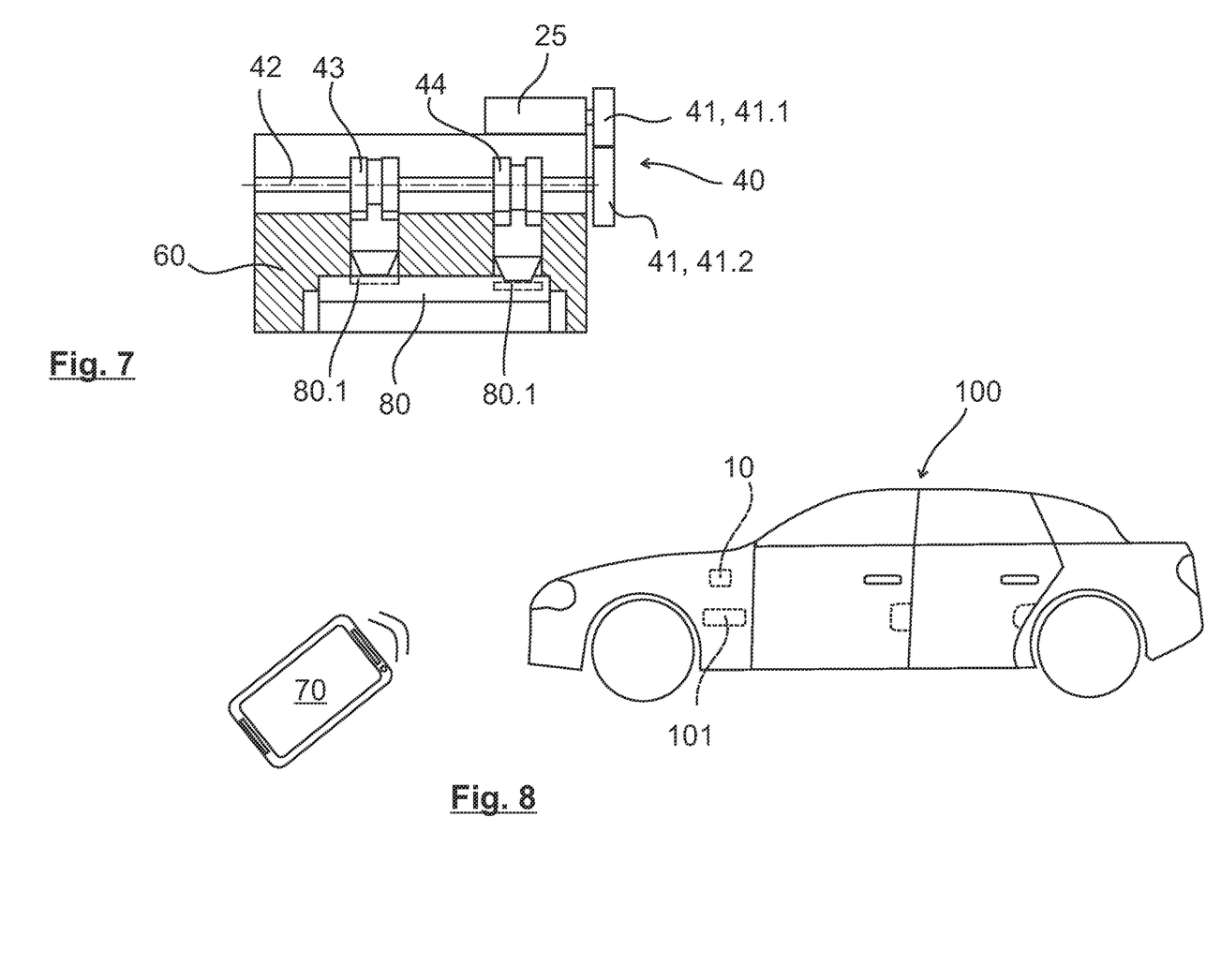

FIG. 7 shows a schematic sectional view of the mechanical actuating mechanism 40 with its drive wheel 41 and at least two actuating tappets 43, 44 for the external ID-transmitter 80 on a drive shaft 42. For a secure operation of its buttons 80.1, the ID-transmitter 80 is fixed within the inlay 60. The mechanical actuation (for operation) of the buttons 80.1 of the ID-transmitter 80 is performed via the two (preferably eccentric) actuating tappets 43, 44 which are driven by the drive shaft 42. The drive wheel 41.2 of the actuating mechanism 40 is driven by a worm wheel 41.1 by the electric drive 25. The drive 25 itself is controlled by the electronic unit 20. This is done by a wireless actuation signal which is transmitted from outside via the first interface 21.1 to the authentication system 10.

FIG. 8 shows an inventive vehicle 100 with the authentication system 10 according to the invention. By means of the mobile communication device, a release code can be generated for the vehicle 100, wherein the help of an external server can also be used if necessary. To prevent the ID-transmitter 80 from lying loose in the vehicle 100, the authentication system 10 is also arranged inside the vehicle 100, in which the ID-transmitter 80 can then be inserted.

The above explanation of the embodiments describes the present invention exclusively in the context of examples. Of course, individual features of the embodiments can be freely combined with each other, if technically reasonable, without leaving the scope of the present invention.

LIST OF REFERENCE SIGNS

10 authentication system
11 outer housing
12 opening
13 closing element
13.1 first closing element
13.2 second closing element
14 fastening means
15 fixing element, in particular mounting plate
20 electronic unit
21 interface
21.1 first interface
21.2 second interface
22 electric security unit
23 monitoring sensor
23.1 first monitoring sensor
23.2 second monitoring sensor
24 plug 25 drive
26 circuit board
26.1 lower circuit board
26.2 upper circuit board
40 actuating mechanism
41 drive wheel
42 drive shaft (with multi-gear profile)
43 first actuating tappet
44 second actuating tappet
60 inlay
61 receiving region for 80
62 battery adapter
70 mobile communication apparatus
80 ID-transmitter, electronic key
80.1 button
80.2 display
100 vehicle, in particular motor vehicle
101 management system with electric immobilizer
I mounting position
IV closed state

The invention claimed is:

1. An authentication system for a vehicle for storing an ID-transmitter in the vehicle comprising:
an outer housing in which the ID-transmitter can be stored,
wherein
an electronic security unit is provided to monitor at least the secure storage of the ID-transmitter within the outer housing, wherein a fixing element is provided to fasten the authentication system in the vehicle, wherein at least one holding means is provided for a mechanical connection between the fixing element and the outer housing in a mounting position, and the electronic security unit comprises at least one monitoring sensor which monitors the mechanical connection between the fixing element and the outer housing in the mounting position.

2. The authentication system according to claim 1, wherein
the authentication system comprises an electronic unit and a battery adapter configured for a voltage supply of the ID-transmitter, wherein the battery adapter is electrically connected to the electronic unit, wherein the battery adapter and the electronic unit are configured to destroy electronics of the ID-transmitter in the event of an overvoltage that can be deliberately generated by the electronic unit.

3. The authentication system according to claim 1, wherein
an electrical drive is provided inside the outer housing.

4. The authentication system according to claim 1, wherein
at least an inlay is provided for mechanical fixation of the ID-transmitter, and the inlay is arranged inside the outer housing or
the ID-transmitter can be mechanically actuated by an actuating mechanism or a battery adapter can be used for voltage supply of the ID-transmitter or
the inlay for mechanical fixation of the ID-transmitter is provided with a further closing element.

5. The authentication system according to claim 1, wherein
at least the authentication system comprises its own voltage supply or
wherein the own voltage supply of the authentication system is electrically rechargeable.

6. The authentication system according to claim 1, wherein
at least the electronic security unit is part of an electronic unit of the authentication system or
an interference signal transmitter is present with which at least a transmitting or receiving signal of the ID-transmitter can be interfered with.

7. The authentication system according to claim 1, wherein
the electronic security unit comprises at least one monitoring sensor or
at least one monitoring sensor generates at least one status signal at at least a theft attempt or manipulation attempt of the authentication system and transmits it to the electronic security unit, which triggers an alarm signal at least in the monitoring mode.

8. The authentication system according to claim 1, wherein
at least at least one closing element is provided,
or
the closing element can also be used for mechanical fixation of the electronic unit within the outer housing.

9. The authentication system according to claim 1, wherein
at least one closing element can be fastened to the outer housing in a mounting position by at least one fastening element.

10. The authentication system according to claim 1, wherein
a first interface is provided which enables wireless data transmission to the authentication system.

11. The authentication system according to claim 1, wherein
a second interface is provided which enables data transmission between a vehicle electronic system and the authentication system.

12. The authentication system according to claim 1, wherein
at least two monitoring sensors are present.

13. The authentication system according to claim 1, wherein
at least the outer housing is a plastic injection molded part or
the outer housing is completely closed in itself except for one opening.

14. The authentication system according to claim 1, wherein
the at least one monitoring sensor is electrically connected to the electronic security unit via at least one connecting cable.

15. The authentication system according to claim 1, wherein
the electronic security unit comprises at least an upper and a lower printed circuit board, which are connected to each other via electric connections, wherein the lower printed circuit board is designed as an interference signal transmitter with a corresponding coil printed on it, wherein the interference signal transmitter is configured to completely interfere with a signal of the external ID-transmitter arranged above.

16. The authentication system according to claim 15, wherein
a gap between the upper printed circuit board and the lower printed circuit board is configured to receive an inlay for the mechanical fixation of the ID-transmitter.

17. A method for monitoring an authentication system for a vehicle for storing an ID-transmitter in the vehicle comprising:

an outer housing in which the ID-transmitter can be stored, wherein at least a theft attempt or manipulation attempt of the authentication system triggers at least one alarm signal, wherein an electronic security unit is provided to monitor at least the secure storage of the ID-transmitter within the outer housing, wherein a fixing element is provided to fasten the authentication system in the vehicle, wherein at least one holding means is provided for a mechanical connection between the fixing element and the outer housing in a mounting position, and the electronic security unit comprises at least one monitoring sensor which monitors the mechanical connection between the fixing element and the outer housing in the mounting position.

18. The monitoring method according to claim 17, wherein at least in a monitoring mode the authentication system can actuate the ID-transmitter.

19. The monitoring method according to claim 17, wherein at least with a triggered alarm signal a destruction of the ID-transmitter is performed or with a triggered alarm signal a warning signal is sent to the management system of the vehicle or with a triggered alarm signal an acoustic siren is controlled or with a triggered alarm signal a warning signal is sent to an external assistance server, or with a triggered alarm signal an emergency signal is sent.

20. The monitoring method according to claim 17, wherein at least one mechanical theft attempt or at least one electronic or mechanical manipulation attempt is detected and triggers an alarm signal.

21. The monitoring method according to claim 20, wherein the monitoring method comprises at least two operating modes:

a) a monitoring mode, in which an active monitoring of the authentication system occurs, b) a workshop mode, in which the monitoring is deactivated in order to perform maintenance and repair work on the authentication system.

* * * * *